United States Patent [19]

Iwata

[11] 4,057,810
[45] Nov. 8, 1977

[54] EXPOSURE CONTROL SYSTEM

[75] Inventor: Hiroshi Iwata, Osaka, Japan

[73] Assignee: West Electric Co., Ltd., Japan

[21] Appl. No.: 604,246

[22] Filed: Aug. 13, 1975

[30] Foreign Application Priority Data

Aug. 20, 1974 Japan .................................. 49-96438
Oct. 18, 1974 Japan .................................. 49-20899

[51] Int. Cl.² .............................................. G03B 7/14
[52] U.S. Cl. .................................. 354/29; 354/23 D;
354/44; 354/60 A
[58] Field of Search .................... 354/23 D, 29, 30, 38,
354/43, 44, 60 R, 60 E, 60 L, 50, 228, 229, 230,
231, 234, 235

[56] References Cited

U.S. PATENT DOCUMENTS

| 3,812,503 | 5/1974 | Engelsmann et al. | 354/60 L |
|---|---|---|---|
| 3,813,680 | 5/1974 | Wagensonner et al. | 354/44 |
| 3,882,522 | 5/1975 | Erlichman | 354/30 |
| 3,900,855 | 8/1975 | Stempeck | 354/38 |
| 3,903,528 | 9/1975 | Kee | 354/50 |

OTHER PUBLICATIONS

*TTL Cookbook*, by Don Lancaster, Howard Sams & Co., 1974, p. 196.

*Primary Examiner*—Russell E. Adams
*Attorney, Agent, or Firm*—Burgess, Ryan and Wayne

[57] ABSTRACT

An exposure control device incorporates an electromagnetic driving device comprising a stator with a plurality of pairs of diametrically opposed poles each mounted with a field coil, a rotor made of a permanent magnet for rotation in either direction through a predetermined angle when one or more than one pairs of poles are magnetized depending upon the brightness of a subject, and means for converting the rotation of the rotor into the force for driving a plurality of shutter blades, which also function as the diaphragm, to open to define a predetermined aperture for a predetermined time depending upon the brightness of the subject.

8 Claims, 12 Drawing Figures

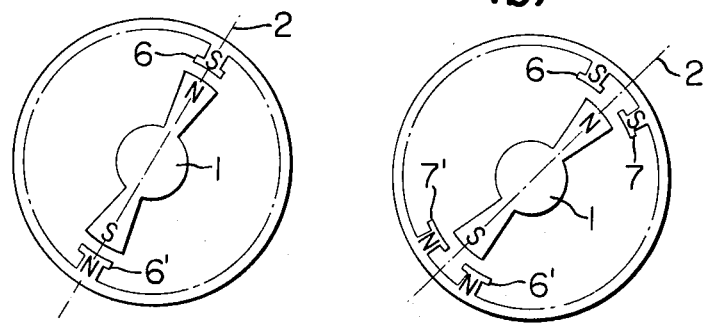
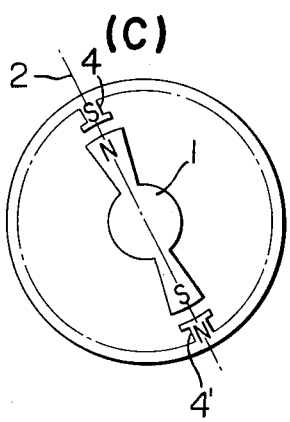
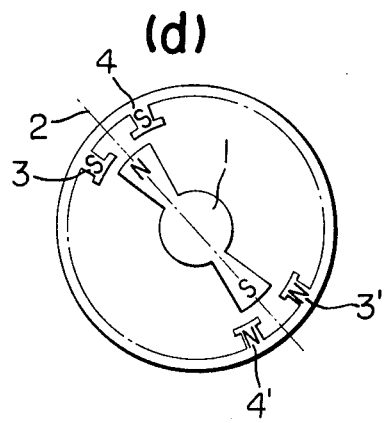
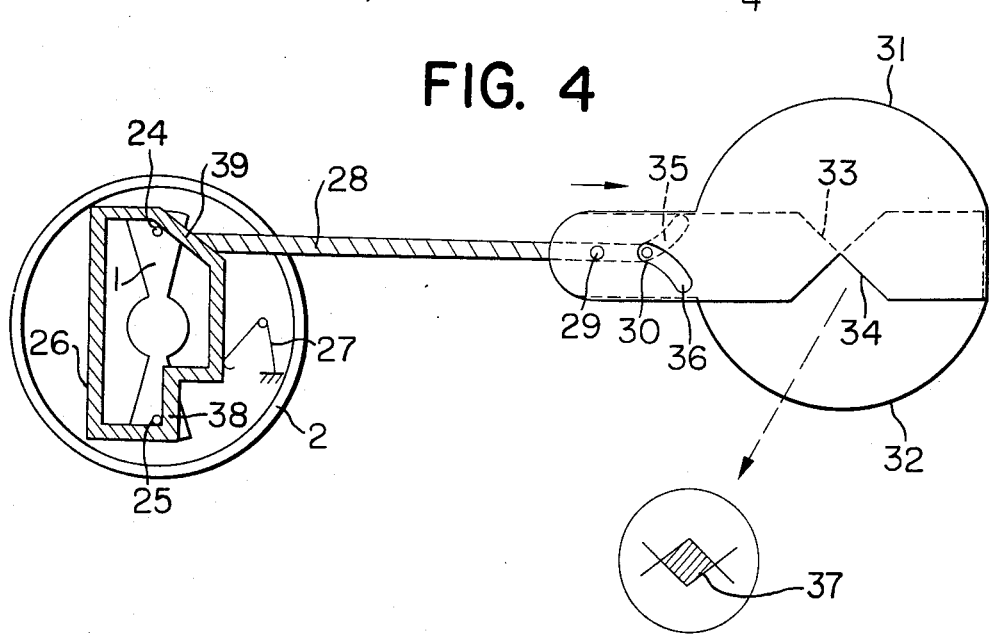

FIG. 10  TABLE I

| F-NUMBER | SWITCH |
|---|---|
| 16 | 17 |
| 11 | 15 |
| 8 | 17,18 |
| 5,6 | 14,15 |
| 0(CLOSED) | 16 |

FIG. 11  TABLE II

| F-NUMBER | SWITCH |
|---|---|
| 16 | 22 |
| 11 | 15 |
| 8 | 23 |
| 5,6 | 19 |
| 0 (CLOSED) | 21 |

FIG. 12  TABLE III

| F-NUMBER | SWITCH | TRANSISTOR |
|---|---|---|
| 16 | 17 | 45 |
| 11 | 15 | 46 |
| 8 | 17,18 | 45,47 |
| 5,6 | 14,15 | 46,48 |
| 0(CLOSED) | 16 | 59 |

4,057,810

1

EXPOSURE CONTROL SYSTEM

BACKGROUND OF THE INVENTION

The present invention relates to an exposure control system of the type incorporating a device for driving a plurality of shutter blades, which also function as the diaphragm, in a rapid yet stable manner so as to attain the optimum exposure in response to the brightness of a subject.

There have been devised and demonstrated various types of the automatic exposure control systems, and they may be generally divided into two fundamental types. One type consists of a diaphragm or aperture setting mechanism including a moving coil, and a shutter mechanism, and depending upon the brightness of a subject, a suitable aperture is pre-selected and then the shutter is opened for a predetermined time. The other type consists of a plurality of shutter blades, which also function as the diaphragm, and a governer mechanism for driving the shutter blades to define a predetermined aperture depending upon the brightness of a subject and to be kept opened at this aperture for a predetermined time depending upon the brightness of the subject. In the former type, the response to the relatively quick variation in brightness of a subject is slow because of the moving coil. For instance, when the brightness of a subject is suddenly increased or reduced at the time when an aperture is set, over- or under-exposure results. Furthermore, the moving coil is easily susceptible to damages by shocks, and the overall construction of the automatic exposure control system is complex because it must incorporate not only the aperture setting mechanism but also the shutter mechanism. The latter type also has a defect that the governer is very complex in construction so that the exposure characteristics will change when it is used many times.

SUMMARY OF THE INVENTION

One of the objects of the present invention is therefore to provide an automatic exposure control system which may satisfactorily withstand the mechanical shocks and which may ensure the optimum exposure depending upon the brightness of a subject during a long service life.

Another object of the present invention is to provide an automatic exposure control system which may set an aperture within a very short time depending upon the brightness of a subject so that the response to the variation in brightness of a subject is very fast.

A further object of the present invention is to provide an automatic exposure control system which may ensure a wide exposure latitude with a faster shutter speed at which the blurring of the picture due to shaking the camera will not occur.

To attain the above and other objects, the present invention provides an electromagnetic driving device for driving a plurality of shutter blades which also function as the diaphragm, the driving device comprising a stator having a plurality of pairs of poles each mounted with a field coil and a rotor made of a permanent magnet and for rotation in either direction through a predetermined angle as one or more than one pairs of the poles are magnetized depending upon the brightness of a subject. Between the shutter blades and the driving device is operatively coupled means for converting the rotation of the rotor into the force for driving the shutter blades. Switch selection means is provided in order to select and magnetize one or more than one pairs of poles of the stator depending upon the brightness of a subject, and in order to control the exposure time, an exposure time setting means is provided for controlling the time during which the current flows through the field coils of the selected poles. Furthermore, means is provided in order to ensure the fast response or rotation of the rotor depending upon the brightness of a subject.

BRIEF DESCRIPTION OF THE DRAWING

FIG. 2 is a view used for the explanation thereof;

FIG. 4 is a diagrammatic view of a first embodiment of the exposure control system in accordance with the present invention;

FIGS. 10, 11 and 12 show the tables illustrating the relationship between the f-numbers and the switches closed for obtaining a desired aperture.

Same reference numerals are used to designate similar parts throughout the figures.

DESCRIPTION OF THE PREFERRED EMBODIMENTS

Figure 1:
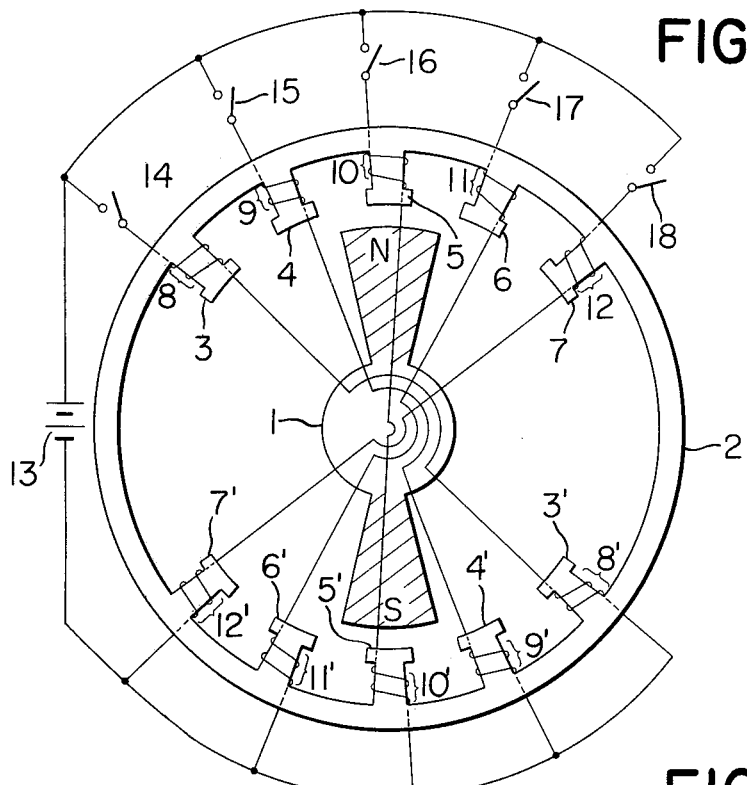
FIG. 1 is a diagrammatic view of a first embodiment of a driving device used in the exposure control system in accordance with the present invention.

FIG. 1 is a diagrammatic view of a driving device used in an exposure control system in accordance with the present invention and comprised of a rotor 1 made of a permanent magnet and supported for rotation within a stator 2 with five pairs of diametrically opposed poles 3 and 3', 4 and 4', 5 and 5', 6 and 6' and 7 and 7'. Field windings 8 and 8', 9 and 9', 10 and 10', 11 and 11', and 12 and 12' mounted on the poles 3 – 7' are connected in series to a power supply 13 through switches 14, 15, 16, 17 and 18, respectively.

Next the mode of operation of the driving device with the above construction will be described with further reference to FIG. 2. It is assumed that in the initial or start position, the north pole N of the rotor 1 is in opposed relation with the pole 5 while the south pole S, is in opposed relation with the pole 5' as shown in FIG. 1. When only the switch 17 is closed, the current flows from the power supply 13 through the field windings 11 and 11' so that the pole 6 is magnetized to the S pole while the pole 6', to the N pole. The N pole of the rotor 1 and the S pole 6 are attracted to each other while the S pole of the rotor 1 and the N pole 6' also are attracted to each other. As a result, the rotor 1 is rotated in the clockwise direction to the position shown in FIG. 2(a). In like manner, when the switches 17 and 18 are closed while the remaining switches 14, 15 and 16 are kept opened, the poles 6 and 7 are magnetized to the S poles while the poles 6' and 7', to the N poles so that the rotor 1 rotates in the clockwise direction to the position shown in FIG. 2(b); that is, the N and S poles of the rotor 1 are held at the midpoints between the adjacent poles 6 and 7 and 6' and 7'. In like manner when only the switch 15 is closed, the rotor 1 rotates in the counterclockwise direction to the position shown in FIG. 2(c), and when the switches 14 and 15 are closed while the remaining switches 16, 17 and 18 are kept opened, the rotor 1 rotates in the counterclockwise direction to the position shown in FIG. 2(d).

Figure 3:
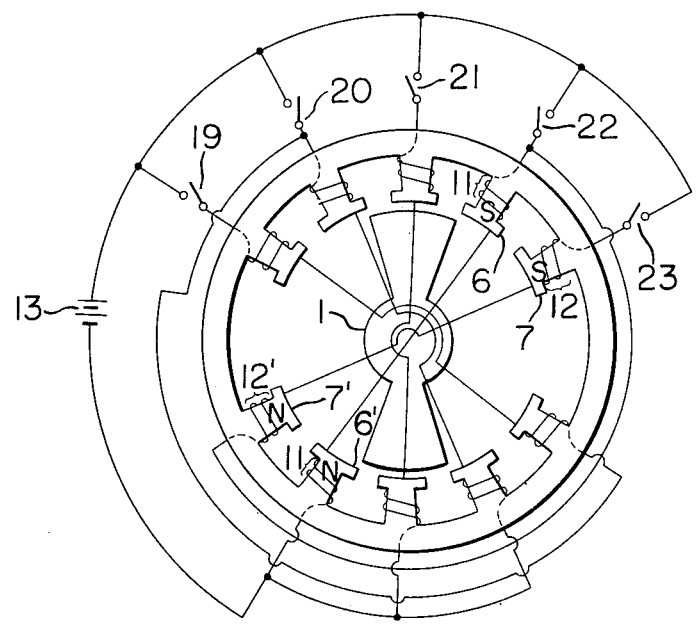
FIG. 3 is a diagrammatic view of a modification of the driving device shown in FIG. 1.

FIG. 3 shows a modification of the driving device which is substantially similar in construction to the driving device shown in FIG. 1 except with respect to the arrangement of the switches 19 through 23. That is, in the driving device shown in FIG. 1 two switches 14 and 15 or 17 and 18 must be simultaneously closed in order to rotate the rotor 1 to the position shown in FIG. 2(d) or 2(b), but according to the modification shown in FIG. 3 only one switch is closed. For instance, when the switch 23 is closed, the pole windings 11, 11', 12 and 12' are energized so that the rotor 1 is rotated to the position shown in FIG. 2(b). In like manner, when the switch 19 is closed, the windings 3, 3', 4 and 4' are energized so that the rotor 1 is rotated to the position shown in FIG. 2(d). Unlike the driving device shown in FIG. 1, the driving device shown in FIG. 3 is not designed that the rotor 1 may be held between the poles 3 and 3' or 7 and 7', but if so required, the design may be changed accordingly.

So far the rotation of the rotor 1 to the desired angular position has been described, and the mode of returning the rotor 1 to the initial position that is, between the poles 5 and 5' will be described in conjunction with the first embodiment of the exposure control system in accordance with the present invention.

FIG. 4 shows a diagrammatic view of the first embodiment of the exposure control system in accordance with the present invention. Two driving pins 24 and 25 are attached to the rotor 1 in a symmetrical relation with respect to the center or axis of the rotor 1, and are made into contact the contoured inner cam surfaces 39 and 38 of a yoke-shaped inverse cam member 26 formed integral with a driving lever 28 with a driving pin 30 attached to the free end thereof, so that the angular displacement of the rotor 1 may be changed into the straight reciprocating motion of the driving pin 30 for opening and closing two shutter blades 31 and 32 which may also function as the diaphragm. A return spring 27 is provided for returning the yoke-shaped inverse cam member 26 to its initial position as quickly as possible. The shutter blades 31 and 32 are pivoted with a common pivot pin 29 and have triangular-shaped cutout portions 33 and 34 which define an aperture and curved guide slots 35 and 36 into which is fitted the driving pin 30.

The inner cam surfaces of the inverse cam member 26 are so designed that when the rotor 1 is rotated from the initial position between the poles 5 and 5' (See FIGS. 1 and 3), the driving pin 30 is caused to displace itself in the direction indicated by the arrow to cause the shutter blades 31 and 32 to move away from each other, thereby defining the aperture 37, and that the displacement of the driving pin 30 and hence the opening area of the aperture 37 may be in proportion to the angle of rotation of the rotor 1.

Next the mode of operation will be described. Assume that only the switch 17 (See FIG. 1) be closed so that the rotor 1 is rotated to the position shown in FIG. 2(a). Then the driving pin 24 of the rotor 1 pushes the inner cam surface 39 of the yoke-shaped inverse cam member 26 to the right so that the driving pin 30 is displaced in the direction indicated in the arrow. As a result, the shutter blades 31 and 32 are moved away from each other about the common pivot pin 29 so that they define the aperture 37. As the yoke-shaped inverse cam member 26 is moved to the right, the return spring 27 is compressed to store the energy.

When the switch 16 is closed simultaneously when the switch 17 is opened, the poles 6 and 6' are de-magnetized while the poles 5 and 5' are magnetized so that the rotor 1 is attracted by the poles 5 and 5'. Concurrently the energy stored in the return spring 27 is released so that the rotor 1 may be rapidly returned to its initial position. Therefore the inverse cam member 26 is also returned to its initial position so that the shutter blades 31 and 32 are closed. Thus the aperture 37 is completely closed.

When only the switch 15 is closed so that the rotor 1 is rotated to the position shown in FIG. 2(c), the driving pin 25 of the rotor 1 causes the yoke-shaped inverse cam member 26 to move to the right. As a result, the driving pin 30 is also displaced in the direction indicated by the arrow, whereby the shutter blades 31 and 32 are displaced to define the aperture 37. When the switch 15 is turned off concurrently with the switch 15 is closed, the shutter blades 31 and 32 are closed in a manner substantially similar to that described hereinbefore. Thus the aperture 37 is also completely closed.

According to the present invention, the opening area of the aperture 37 corresponds to an f-number or aperture setting. Assume that when the rotor 1 is rotated to the position shown in FIG. 2(a) the aperture 37 defines F16 while when the rotor 1 is rotated to the position shown in FIG. 2(c), the aperture 37 defines F11. The opening area of the aperture 37 defining F11 is larger than that of the aperture 37 defining F16 so that the displacement of the driving pin 30 for defining F11 must be longer than that of the driving pin for defining F16. For this purpose, the cam surface portion 39 is so contoured as to substantially correspond with the path of the displacement of the driving pin 24 so that during counterclockwise rotation of the rotor 1 as it appears in FIG. 4, driving pins 24 and 25, and the cam surface portion 38 with which the driving pin 25 contacts does not correspond with the path of displacement of the driving pin 25 so that during counterclockwise rotation of the rotor 1 the displacement of the driving pin 30 caused by the displacement of the inverse cam 26 by the driving pin 25 may be longer than that caused by the displacement caused by the driving engagement with the inverse cam 26 of the driving pin 24. When the driving pin 24 or 25 rotates in the same direction, the greater the angle of rotation thereof, the longer the displacement of the driving pin 30 becomes.

Figure 5:
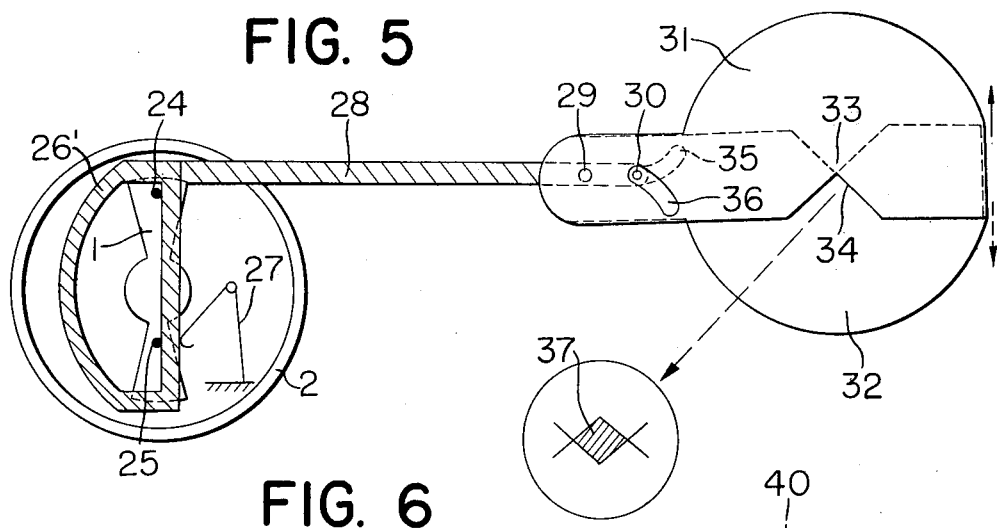
FIG. 5 is a diagrammatic view of a modification thereof.

FIG. 5 shows the second embodiment of the exposure control system in accordance with the present invention which is substantially similar in construction to the first embodiment shown in FIG. 4 except that the distance between the driving pin 25 and the center or axis of the rotor 1 is shorter than the distance between the driving pin 24 and the center or axis of the rotor 1 (whereas in the first embodiment, both the driving pins 24 and 25 are spaced apart from the center or axis of the rotor 1 by the same distance). The cam surfaces with which the driving pins 24 and 25 contact are the same. It will be readily understood that the displacement of the driving pin 30 and hence the opening area 37 defined by the shutter blades 31 and 32 is dependent upon whether the yoke-shaped inverse cam 26' is displaced by the driving pin 24 or 25.

When the driving device of the type shown in FIG. 1 is used in the exposure control system shown in FIG. 4 or 5, the aperture 37 defines an f-number as the switches are closed as shown in Table I in FIG. 10. In like manner, when the driving device of the type shown in FIG. 3 is used, the aperture 37 defines an f-number as the switch is closed as shown in Table II in FIG. 10.

Figure 6:
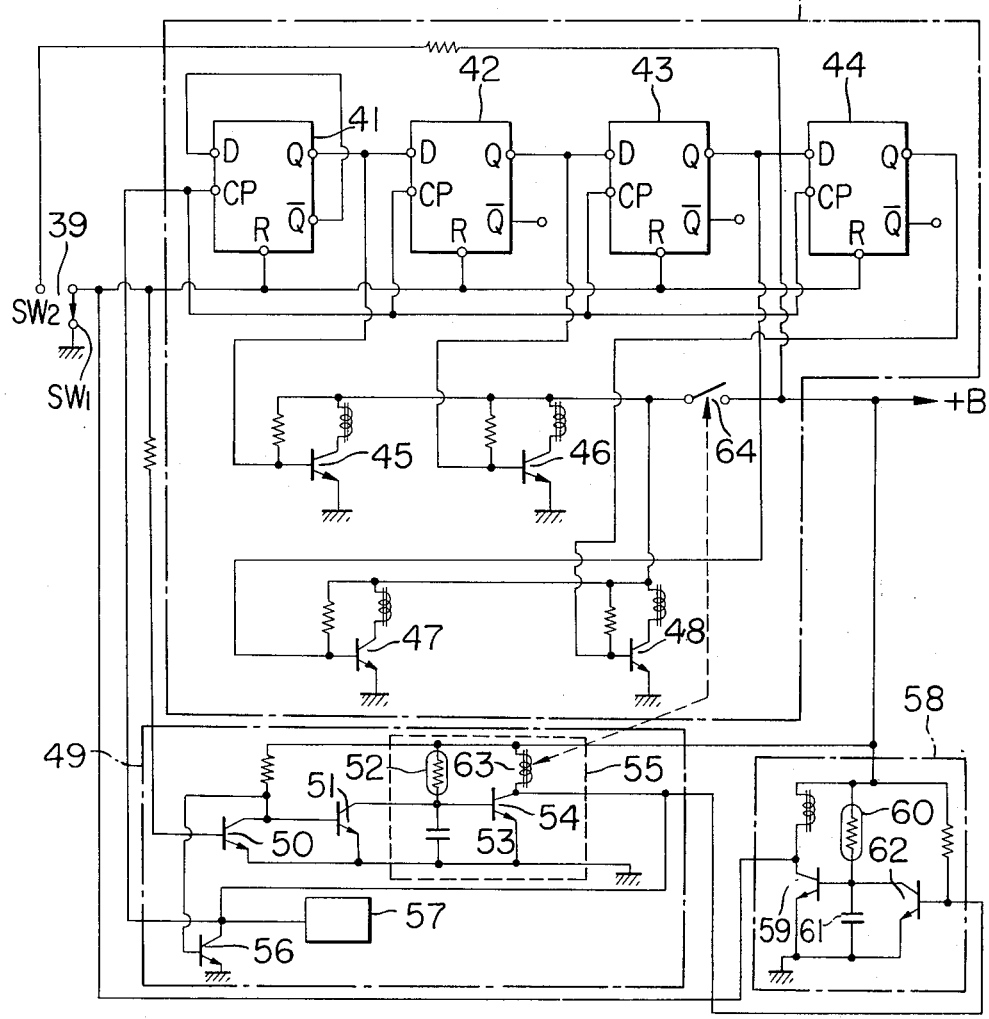
FIG. 6 is a diagram of an electronic control circuit thereof.

FIG. 6 is a diagram of an electronic control circuit for controlling the exposure control system of the present invention depending upon the brightness of a subject. The electronic control circuit generally comprises a switch selection circuit 40, an aperture setting circuit 49 for setting the aperture in response to the brightness of a subject, and an exposure time setting or control circuit 58 for controlling the exposure or opening time of the shutter blades.

Figure 7:
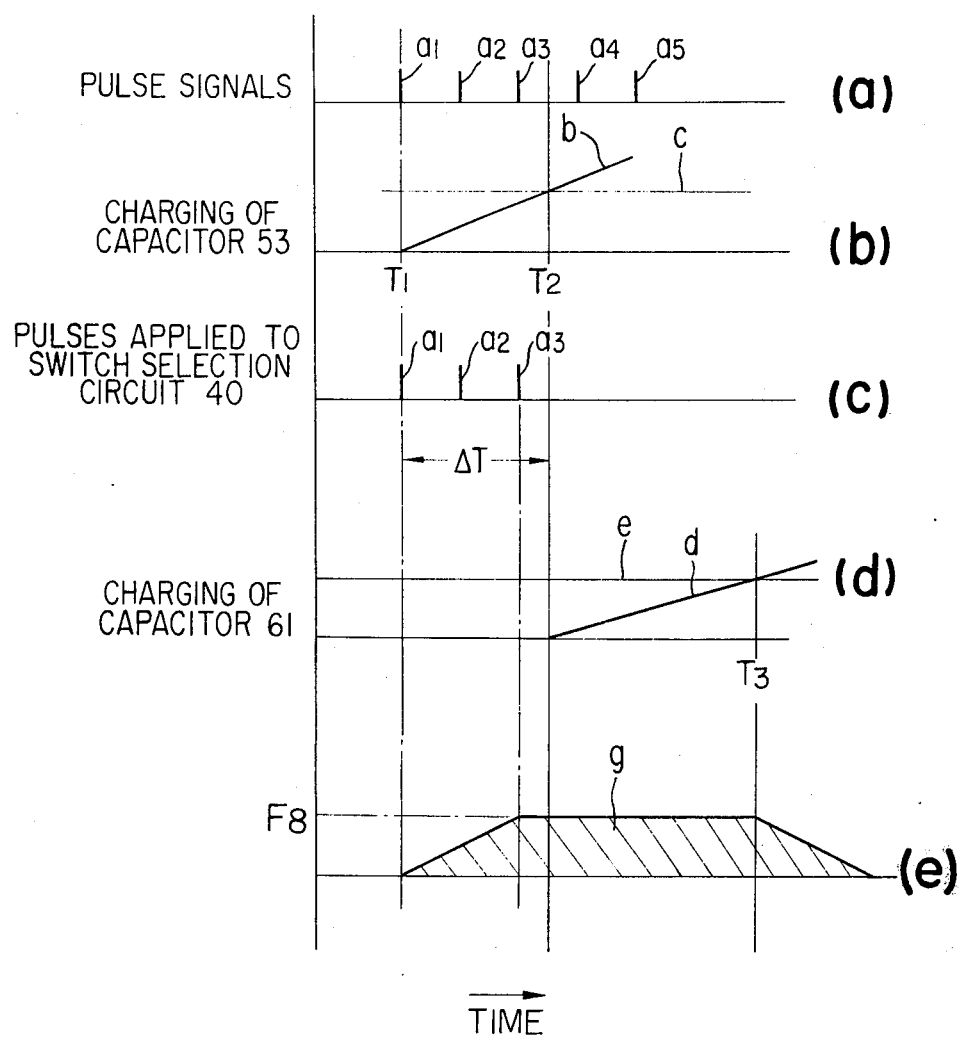
FIG. 7 is a time chart used for the explanation thereof.
Figure 9:
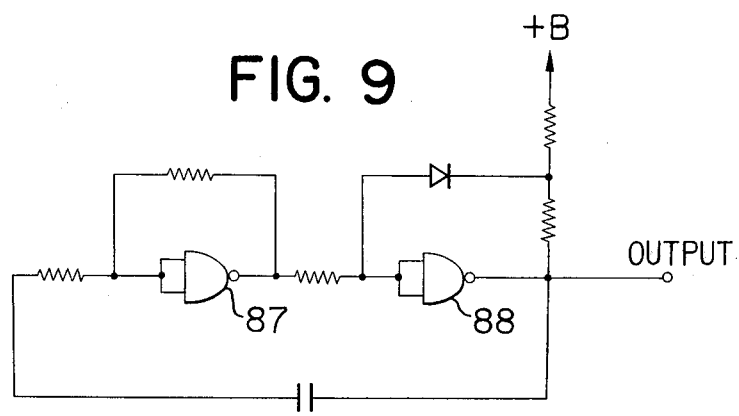
FIG. 9 is a detailed diagram of a pulse generator shown in FIG. 6.

Next referring further to FIG. 7, the mode of operation of the electronic control circuit will be described. When a switch 39, which is interlocked with a shutter release button or the like (not shown), is switched to open a terminal $SW_1$ (when this terminal is closed, the exposure control system is kept reset), but to close a terminal $SW_2$, the pulse signals $a_1, a_2, a_3, a_4$...(See FIG. 7(a) ) are generated by a pulse generator 57 and applied to the switch selection circuit 40. The pulse generator 57 may be the conventional astable multivibrator of the type consisting of two NAND gates 87 and 88 as shown in FIG. 9.

When the first pulse $a_1$ is applied to the CP terminals of D flip-flops 41, 42, 43 and 44, the D and $\overline{Q}$ terminals of the D flip-flop 41 drop to the low level while the Q terminal rises to the high level so that a transistor 45 is turned on. However, the Q terminals of the D flip-flops 42, 43 and 44 remain at the low level, transistors 46, 47 and 48 remain turned off. When the second pulse $a_2$ arrives, the Q terminal of the D flip-flop 41 reverses to the low level so that the transistor 45 is turned off. In response to the second pulse $a_2$, the Q terminal of the D flip-flop 42 rises to the high level while the D terminal, to the low level. Therefore the transistor 46 is turned on. Since the Q terminals of the D flip-flops 43 and 44 remain still at the low level, the transistors 47 and 48 remain turned off.

When the third pulse $a_3$ arrives, the Q terminal of the D flip-flop 43 rises to the high level so that the transistor 47 is turned on. Since the Q terminal of the flip-flop 41 rises to the high level again while the Q terminal of the D flip-flop 42 drops to the low level, the transistor 45 is turned on while the transistor 46 is turned off. The Q terminal of the D flip-flop 44 remains at the low level.

When the fourth pulse $a_4$ arrives, the Q terminal of the D flip-flop 41 drops to the low level while the Q terminals of the D flip-flops 42 and 44 rise to the high level. Therefore, the transistors 45 and 47 are turned off while the transistors 46 and 48 are turned on.

Therefore, the transistors 45, 46, 47 and 48 may function as the switches 14 – 17 as shown in Table III in FIG. 12.

Next the mode of setting the f-number and the exposure time in response to the brightness of a subject will be described. As the switch 39 closes the terminal $SW_2$, a transistor 50 is turned on, and a transistor 56, which has been interrupting the output pulses from the pulse generator 57, is also turned on, so that the output pulses are transmitted to the switch selection circuit 40 from the pulse generator 57. As the transistor 50 is turned on, the base and emitter of a transistor 51 are short-circuited so that the transistor 51 is turned off and a capacitor 53 is not short-circuited. Therefore a circuit for detecting the the brightness of a subject is actuated so that the current flows through a photoelectric cell such as CdS 52 which intercepts the light from the subject and charges the capacitor 53. When the voltage charged across the capacitor 53 reaches at $T_2$ the threshold voltage C of the transistor 54 as shown in FIG. 7(b), the transistor 54 is turned on so that the output of the pulse generator 57 is short-circuited. As a result, no pulse is applied to the switch selection circuit 40 any longer. As shown in FIG. 7(c), three pulses $a_1, a_2$ and $a_3$ are applied to the switch selection circuit 40 between $T_1$ and $T_2$; that is, from the time when the transistor 50 is turned on to the time when the transistor 56 is turned on, so that the transistors 45 and 47 are turned on. As a result, the shutter blades set the aperture of F8 as shown in Table III.

When two pulses $a_1$ and $a_2$ are applied to the switch selection circuit 40 within a time interval $\Delta T$, the transistor 45 is turned on in response to the first pulse $a_1$ so that the rotor 1 is rotated in the clockwise direction and then in response to the second pulse $a_2$ the transistor 46 is turned on so that the rotor 1 is rotated in the counterclockwise direction. Therefore it takes a relatively long time before the rotor 1 is held between the poles 4 and 4'. But according to the present invention, a relay 63 is connected so that the rotor 1 may be immediately and directly rotated between the poles 4 and 4'. That is, the relay 63 is so arranged that it will not be energized unless the transistor 54 is turned on; that is, at the time $T_2$. Therefore, a contact 64 is opened until $T_2$ so that + B power supply is not connected to the transistors 45 – 48. When the power is supplied from the + B power supply, the transistor 46 is turned on in response to the pulse $a_2$ so that the rotor 1 may be immediately and directly rotated between the poles 4 and 4'. Thus, the aperture F11 may be set. When the brightness of the subject is high, the voltage across the capacitor 53 reaches the threshold voltage of the transistor 54 within a relatively short time. That is, the time interval $\Delta T$ becomes shorter. As a result, the number of pulses applied to the switch selection circuit 40 becomes less so that the smaller f-number is obtained.

Next the exposure time control will be described. A transistor 62 is turned off simultaneously when the transistor 50 is turned on and the transistor 56 is turned off, so that the exposure time control circuit 58 is actuated. A photoelectric cell 60 such as CdS intercepts the light from a subject, and a capacitor 61 is charged accordingly as shown in FIG. 7(d). When the voltage across the capacitor 61 rises at $T_3$ to the threshold voltage level e, a transistor 59 is turned on so that D flip-flops 41, 42, 43 and 44 are reset. As a result, the transistors 45, 46, 47 and 48 are turned off. Since the transistor 59, which has been turned on, corresponds to the switch 21 as shown in Table II, the rotor 1 is returned to the initial position between the poles 5 and 5' so that the shutter blades are closed. Therefore the opening characteristic curve g is obtained as shown in FIG. 7(e). That is, the aperture is gradually opened from time $T_1$ to $T_2$ to the aperture F8, remains F8 until $T_3$ and then is closed. The characteristic curve g is therefore in the form of a trapezoid.

Figure 8:
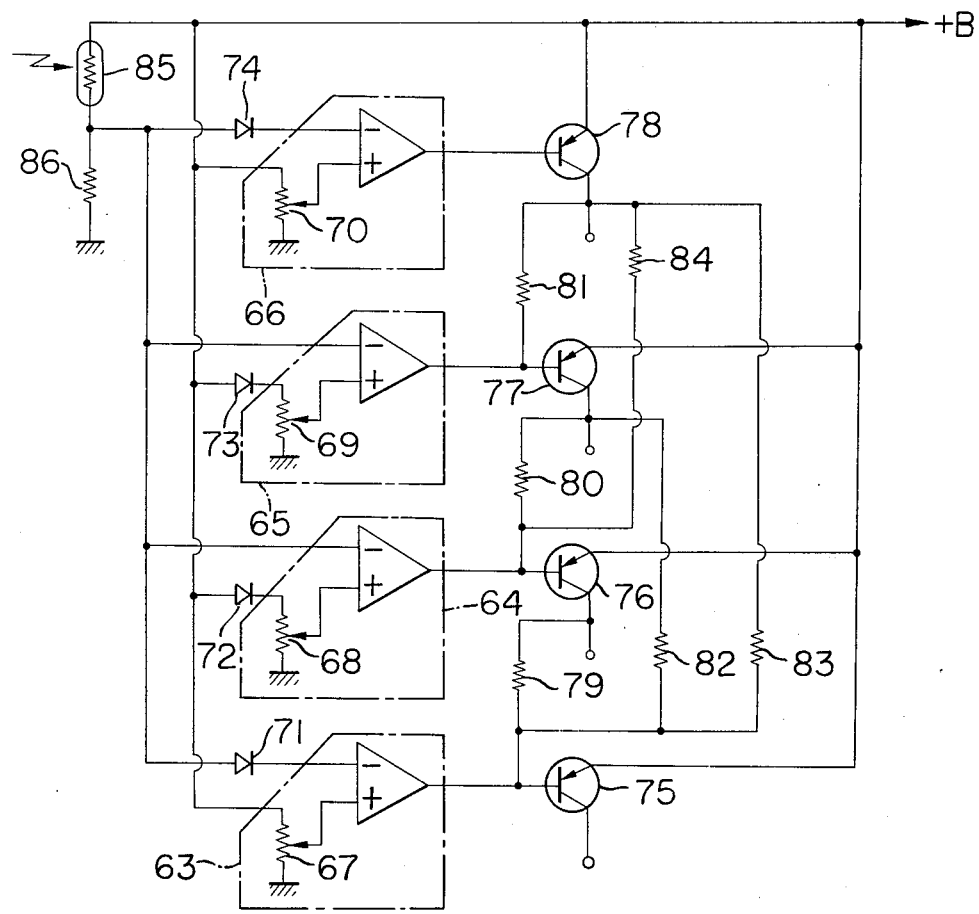
FIG. 8 is a diagram of a modification of the switch selection circuit means shown in FIG. 6.

FIG. 8 shows a modification of the switch selection circuit which is adapted for use with the driving device of the type shown in FIG. 3. Values of the variable resistors 67, 68, 69 and 70 are so selected that the reference input levels applied to one input terminals of comparators 63, 64, 65 and 66 may become higher in the order named. The outputs of the comparators 63 – 66 are connected to switching transistors 75, 76, 77 and 78, respectively, which correspond to the switches of the driving device shown in FIG. 3. The voltage across a resistor 86, which is dependent upon the brightness of a subject intercepted by a photoelectric cell such as CdS 85, is applied through diodes 71, 72, 73 and 74, respectively, to the other input terminals of the comparators 63, 64, 65 and 66 to be compared with the reference voltages. Assume that the brightness of a subject is relatively low so that the outputs from the comparators 63 and 64 drop from the high level to the low level. Since a resistor 79 short-circuits between the base and emitter of the transistor 75, only the transistor 76 is turned on. When the brightness of a subject is relatively high so that the outputs of all the comparators 63 – 66 drop to the low level, resistors 81, 83 and 84 short-circuit between the base and emitters of the transistors 75, 76 and 77 so that only the transistor 76 is turned on. In this manner, the switching transistors 75, 76, 77 and 78 which correspond to the switches 19, 23, 20 and 22 respectively, of the driving device shown in FIG. 3 may be turned on and off so that the aperture may be set as shown in Table II depending upon the brightness of a subject.

As described hereinbefore, according to the present invention, the shutter blades are opened and closed by the electric driving device in which the rotor is rotated within the stator from the initial position through a predetermined angle depending upon the brightness of a subject and then returned to the initial position after a predetermined time which is also dependent upon the brightness of a subject. Therefore the defects caused by the conventional mechanical exposure control systems may be substantially overcomed. Furthermore the exposure control systems in accordance with the present invention has a very distinct advantage in that even though the position of the rotor is sequentially determined, the rotor is immediately and directly rotated to the position depending upon the brightness of a subject. That is, the rotor is not displaced stepwise. Furthermore the rotor is rotated about its axis in the clockwise or counterclockwise direction so that the displacement speed of the rotor may be reduced one half as compared with the system in which the rotor is rotated only in one direction. As a result, the steep rising and falling time of the opening characteristic curve g may be ensured (See FIG. 7(e) ).

So far the driving devices have been shown and described in a two-dimensional manner, but it will be understood that they may be arranged in such a three-dimensional manner that the cross sectional area of the driving devices may be minimized. For instance, the poles of the stator and rotor may be extended axially, and the poles of the stator may be arranged to function as described referring to FIG. 1 or 3.

What is claimed is:

1. An exposure control system comprising
a plurality of shutter blades which also function as the diaphragn blades,
a driving device comprising
a stator having a plurality of pairs of angularly separated opposed poles, field coils mounted on each pair of stator poles, and
a rotor having a pair of poles one of which is magnetized to the N pole and the other is magnetized to the S pole, and positioned stationarily between one of said pairs of poles, which is located at the center of poles when said shutter blades are closed, means operatively connecting said rotor to said shutter blades;
a plurality of switches, each connected to a different pair of said opposed field coils, switch selection means responsive to a control signal for selectively actuating different ones of said switches or pairs of said switches connected to adjacent field coils to establish a magnetic field within said stator at an angle having a one-to-one correlation with the value defined by said control signal, said magnetic field interacting with said rotor poles to generate a driving force to rotate said rotor into alignment with said magnetic field,
aperture setting means responsive to the brightness of a subject for providing said control signal for actuating said switch selection means, said control signal being provided to said switch selection means prior to the actuation of said switches or pairs of switches by said selection means, thereby causing said shutter blades to define a predetermined aperture depending upon the brightness of said subject,
exposure time setting means responsive to the brightness of said subject for controlling the operating time of said switch selection means; thereby controlling the opening time of said shutter blades depending on the brightness of said subject, and
electrical power supply means for providing current to said switches, whereby said shutter blades are driven to define a predetermined aperture for a predetermined time depending upon the brightness of a subject, thereby attaining the optimum exposure.

2. An exposure control system as set forth in claim 1 wherein said switch selection means comprises
a plurality of D flip-flops each actuable in response to the control signal from said aperture setting means, and
a plurality of transistors operatively interconnected between said D flip-flops and said field coils.

3. An exposure control system as set forth in claim 1 wherein said exposure time setting means comprises
a photometry circuit means for detecting the brightness of a subject and generating the integrated output representative thereof,
means for actuating said photometry circuit means after and only after said switch selection means has selected one or more than one of said switching means and connected it or them to its or their corresponding field coil or coils, and means for resetting said switch selection means and keeping it inoperative when said integrated output from said photometry circuit means reaches a predetermined level.

4. An exposure control system comprising:
a plurality of shutter blades which also function as the diaphragm blades;
a driving device comprising (i) a stator having a plurality of pairs of angularly separated opposed poles, field coils mounted on each pair of stator poles, and (ii) a rotor having a pair of poles one of which is magnetized to the N pole and the other is magnetized to the S pole, and positioned stationarily between one of said pairs of poles, which is located at the center of poles when said shutter blades are closed, means operatively connecting said rotor to said shutter blades;
a plurality of switches, each connected to a different pair of said opposed field coils, switch selection means responsive to a control signal for selectively actuating different ones of said switches or pairs of said switches connected to adjacent field coils, thereby establishing a magnetic field within said stator at an angle depending on said control signal, aperture setting means responsive to the brightness of a subject for providing said control signal for actuating said switch selection means, said aperture setting means comprising: (i) photometry circuit means for detecting the brightness of a subject and generating the integrated output representative of the brightness of the subject, i.e., the total value of brightness of the subject as a function of a time, pulse generator means for generating pulses with a predetermined pulse spacing and for applying said pulses to said switch selection means prior to the actuation of said plurality of switches, and (ii) means for interrupting the transmission of said pulses from said pulses generator means to said switch selection means when said integrated output reaches a predetermined value, thereby causing said shutter blades to define a predetermined aperture depending upon the brightness of said subject, exposure time setting means responsive to the brightness of said subject for controlling the operating time of said switch selection means; thereby controlling the opening time of said shutter blades depending on the brightness of said subject, and electrical power supply means for providing current to said switches, whereby said shutter blades are driven to define a predetermined aperture for a predetermined time depending upon the brightness of a subject, thereby attaining the optimum exposure.

5. An exposure control system as set forth in claim 4 wherein said aperture setting means further comprises means for interrupting the power supply from said electric power supply means to said switching means until said switch selection means has selected one or more than one of said switching means to be connected to its or their corresponding field coils.

6. An exposure control system as set forth in claim 5 wherein said power supply interrupting means comprises
a relay which is energized when the integrated output from said photometry circuit reaches a predetermined level.

7. An exposure control system comprising:
a plurality of shutter blades which also function as the diaphragm blades;
a driving device comprising (i) a stator having a plurality of pairs of angularly separated opposed poles, field coils mounted on each pair of stator poles, and (ii) a rotor having a pair of poles one of which is magnetized to the N pole and the other is magnetized to the S pole, and positioned stationarily between one of said pairs of poles, which is located at the center of poles when said shutter blades are closed, means operatively connecting said rotor to said shutter blades;
a plurality of switches, each connected to a different pair of said opposed field coils, switch selection means responsive to a control signal for selectively actuating different ones of said switches or pairs of said switches connected to adjacent field coils, thereby establishing a magnetic field within said stator at an angle depending on said control signal;
means operatively coupled between said driving device and said shutter blades for driving said shutter blades, said means comprising (i) two driving pin means attached to said rotor and spaced apart in either direction from the axis of said rotor by a suitable distance, (ii) an inverse cam means for engagement with said two driving pin means, (iii) return spring means attached to said inverse cam means for imparting the energy stored during the displacement of said inverse cam means to said inverse cam means, thereby causing said inverse cam means to return quickly to its initial position, and (iv) means operatively coupled between said inverse cam means and said shutter blades for transmitting the displacement of said inverse cam means to said shutter blades, thereby causing said shutter blades to open and close;

aperture setting means responsive to the brightness of a subject for providing said control signal for actuating said switch selection means, thereby causing said shutter blades to define a predetermined aperture depending upon the brightness of said subject;

exposure time setting means responsive to the brightness of said subject for controlling the operating time of said switch selection means; thereby controlling the opening time of said shutter blades depending on the brightness of said subject; and electrical power supply means for providing current to said switches, whereby said shutter blades are driven to define a predetermined aperture for a predetermined time depending upon the brightness of a subject, thereby attaining the optimum exposure.

8. An exposure control system comprising:
a plurality of shutter blades which also function as the diaphragm blades;
a driving device comprising (i) a stator having a plurality of pairs of angularly separated opposed poles, field coils mounted on each pair of stator poles, and (ii) a rotor having a pair of poles one of which is magnetized to the N pole and the other is magnetized to the S pole, and positioned stationarily between one of said pairs of poles, which is located at the center of poles when said shutter blades are closed, means operatively connecting said rotor to said shutter blades;
a plurality of switches, each connected to a different pair of said opposed field coils, switch selection means responsive to a control signal for selectively actuating different ones of said switches or pairs of said switches connected to adjacent field coils, said switch selection means comprising (i) a plurality of comparators for comparing an input signal representative of the brightness of said subject with a reference signal and for providing a reversal of an output signal when the level of the input signal exceeds the level of the reference signal and (ii) a plurality of transistors operatively interconnected between said comparators and said field coils for selectively energizing said field coils in response to the reversal of said output signals, thereby establishing a magnetic field within said stator at an angle depending on said control signal;
aperture setting means responsive to the brightness of a subject for providing said control signal for actuating said switch selection means, thereby causing said shutter blades to define a predetermined aperture depending upon the brightness of said subject;

exposure time setting means responsive to the brightness of said subject for controlling the operating time of said switch selection means; thereby controlling the opening time of said shutter blades depending on the brightness of said subject; and
electrical power supply means for providing current to said switches, whereby said shutter blades are driven to define a predetermined aperture for a predetermined time depending upon the brightness on a subject, thereby attaining the optimum exposure.

* * * * *